US008898330B2

(12) United States Patent
Quang et al.

(10) Patent No.: US 8,898,330 B2
(45) Date of Patent: Nov. 25, 2014

(54) SERVER NODE CONFIGURATION USING A CONFIGURATION TOOL

(75) Inventors: Pham Quang, Sofia (BG); Ivan Ivanov, Sofia (BG); Krasimira Kalincheva, Sofia (BG)

(73) Assignee: SAP SE, Walldorf (DE)

( * ) Notice: Subject to any disclaimer, the term of this patent is extended or adjusted under 35 U.S.C. 154(b) by 2385 days.

(21) Appl. No.: 10/856,079

(22) Filed: May 28, 2004

(65) Prior Publication Data

US 2005/0278445 A1 Dec. 15, 2005

(51) Int. Cl.
*G06F 15/173* (2006.01)
*H04L 29/08* (2006.01)
*G06F 15/16* (2006.01)

(52) U.S. Cl.
CPC .................................. *H04L 67/1095* (2013.01)
USPC ............................ 709/238; 709/223; 709/234

(58) Field of Classification Search
USPC .......................................................... 709/238
See application file for complete search history.

(56) References Cited

U.S. PATENT DOCUMENTS

| | | | | |
|---|---|---|---|---|
| 6,236,999 | B1 * | 5/2001 | Jacobs et al. | 707/10 |
| 6,760,771 | B1 * | 7/2004 | Giroir et al. | 709/230 |
| 7,139,792 | B1 * | 11/2006 | Mishra et al. | 709/203 |
| 7,185,076 | B1 * | 2/2007 | Novaes et al. | 709/223 |
| 2004/0098475 | A1 * | 5/2004 | Zeitler et al. | 709/223 |
| 2004/0098490 | A1 * | 5/2004 | Dinker et al. | 709/229 |
| 2004/0260832 | A1 * | 12/2004 | Kota et al. | 709/234 |

* cited by examiner

*Primary Examiner* — John Follansbee
*Assistant Examiner* — Alan S Chou
(74) *Attorney, Agent, or Firm* — Schwegman Lundberg & Woessner, P.A.

(57) ABSTRACT

A system and method are provided to configure a server node using a configuration tool. In an embodiment, a local node identifier is generated to identify a server node. One or more local properties of the server node may also be generated. In an embodiment, a cluster definition that is persistently stored on a database is updated with the one or more local properties.

24 Claims, 12 Drawing Sheets

```
#config.input.properties                    Properties File 236

          install.dir=/usr/sap/C11/JC06/j2ee
305 ─────▶ servers.count=2

310 ─────▶ system.id=06
315 ─────▶ box.number=C11JC06p78124

          dispatcher.heap.size=133
          server.heap.size=1000

          os.bit.length=32
          os.unicode=yes
          os.name=ntintel

          java.home=/java/jdk1.3.1_07

          system.name=C11

          secstorefs.lib=/usr/sap/C11/SYS/global/security/lib
          secstorefs.keyfile=/usr/sap/C11/SYS/global/security/data/
          SecStore.key
          secstorefs.secfile=/usr/sap/C11/SYS/global/security/data/
          SecStore.properties
       ┌─ rdbms.connection=jdbc/pool/C11
       │  rdbms.driver=not_needed
320 ┤   rdbms.initial.connections=1
       │  rdbms.driverLocation=/sapdb/programs/runtime/jar/sapdbc.jar
       └─ rdbms.maximum.connections=5

          password.crypted=yes
          admin.password=des19(AA|BB|CCC|DDD|)
          guest.password=des19(AA|BB|CCC|DDD|)

       ┌─ enq.host=p78124
325 ┤   enq.port=3201
       └─ enq.profile.filename=/usr/sap/C11/SYS/profile/C11_JC06_p78124

330 ┤┌─ ms.host=p78124
     └─ ms.port=3601

          sysDS.maxTimeToWaitConnection=120
          sysDS.driverClassName=not_needed
          sysDS.SQLEngine=Open_SQL
          sysDS.connectionLifetime=600
          sysDS.dataSourceName=SAPC11DB
          sysDS.maximumConnections=10
          sysDS.initialConnections=1
          sysDS.runCleanupThreadInterval=300
          sysDS.aliases=SAP/BC_JMS,SAP/BC_UME,SAP/
          BC_WDRR,SAP/BC_SLD,SAP/BC_UDDI,SAP/BC_XMLA

          console.log.dir=./log/console_logs
          console.log.output.stream=yes
          console.log.days.to.keep=7
          console.log.error.stream=yes
```

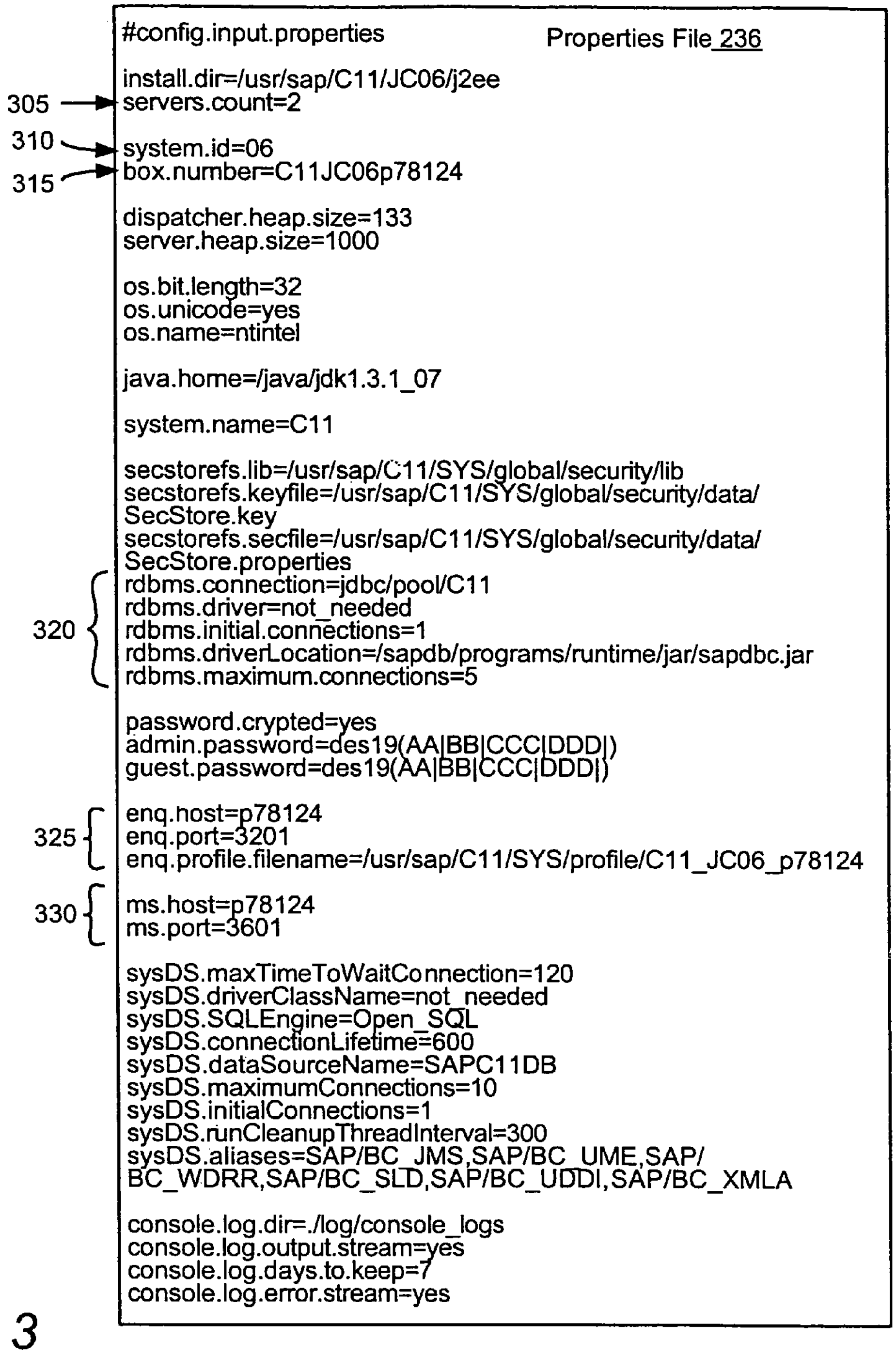

SERVER NODE CONFIGURATION USING A CONFIGURATION TOOL

TECHNICAL FIELD

Embodiments of the invention generally relate to the field of data processing systems and more particularly, to a system and method for server node configuration using a configuration tool.

BACKGROUND

Many businesses are providing access to their products and services through applications that are delivered over computer networks such as the Internet. These applications typically have a multi-tiered architecture. In those cases where the applications are delivered over the Internet they are commonly referred to as Web-based applications. FIG. 1 is a block diagram of a Web-based application 100 having a multi-tiered architecture.

Web-based application 100 includes client layer 110, application layer 120, and database layer 130. Client layer 110 includes user interface 112 that runs on a client computing device such as a desktop computer, laptop computer, personal digital assistant, telephone, and the like. In a Web-based environment, user interface 112 is typically a Web browser. User interface 112 may collect input from a user and provide that input to application layer 120 for processing.

Application layer 120 includes application server 122 to receive and process input from client layer 110. Application server 122 typically includes a number of subcomponents including, for example, connectivity layer 140, presentation logic 142, business logic 144, and database interface 146. Connectivity layer 140 provides connections to client layer 110 using protocols such as the HyperText Transfer Protocol (HTTP), HTTP secured through the Secure Socket Layer, the Simple Object Access Protocol (SOAP), and the like. Presentation logic 142 generates a Graphical User Interface (GUI) using, for example, a markup language such as the Hyper Text Markup Language (HTML). Business logic 144 represents the core of the application, for example, the rules governing the underlying business process (or other functionality) provided by the application. Database interface layer 146 provides an interface to database layer 130. The Java 2 Enterprise Edition Specification v1.3; published on Jul. 27, 2001 (the J2EE Standard) defines an increasingly popular architecture for application layer 120.

Database layer 130 includes data access logic used by business logic 144 to store and retrieve data in database 132. Database 132 provides non-volatile storage (sometimes referred to as a persistent store) for the data accessed and/or processed by application layer 120. Database 132 may be, for example, a relational database or an object-oriented database.

Although the multi-tiered architecture provides a more flexible and scalable architecture than traditional two-tier systems, it also results in significant added complexity. For example, managing the configuration of multiple instances of an application server and the dependencies between them can require a significant amount of administrative overhead.

SUMMARY OF THE INVENTION

A system and method are provided to configure a server node using a configuration tool. In an embodiment, a local node identifier is generated to identify a server node. One or more local properties of the server node may also be generated. In an embodiment, a cluster definition that is persistently stored on a database is updated with the one or more local properties.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 3 is an illustration of selected elements of a properties file, according to an embodiment of the invention.

DETAILED DESCRIPTION

A system and method are provided to configure a server node using a configuration tool. In an embodiment, a local node identifier is generated to identify a server node. One or more local properties of the server node may also be generated. As is further described below, in an embodiment, a cluster definition that is persistently stored on a database is updated with the one or more local properties.

Figure 1:
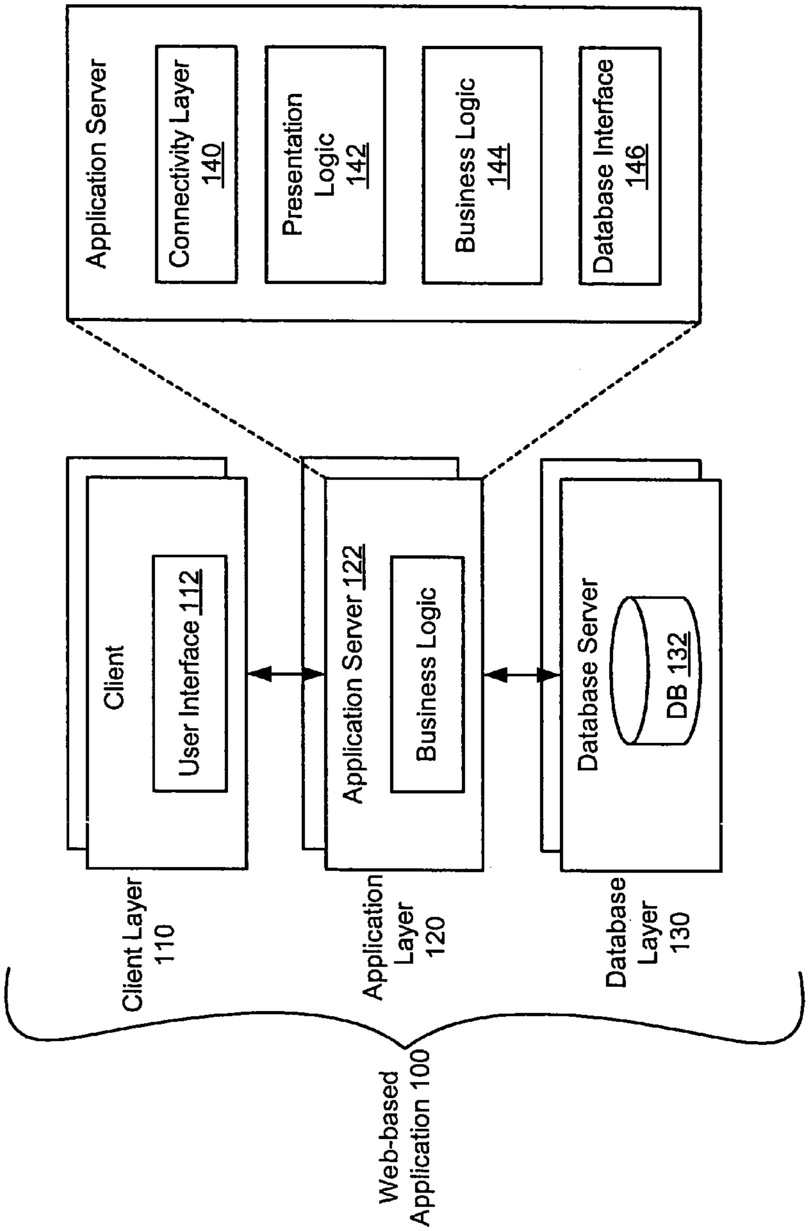
FIG. 1 is a block diagram of a Web-based application having a multi-tiered architecture.
Figure 2:
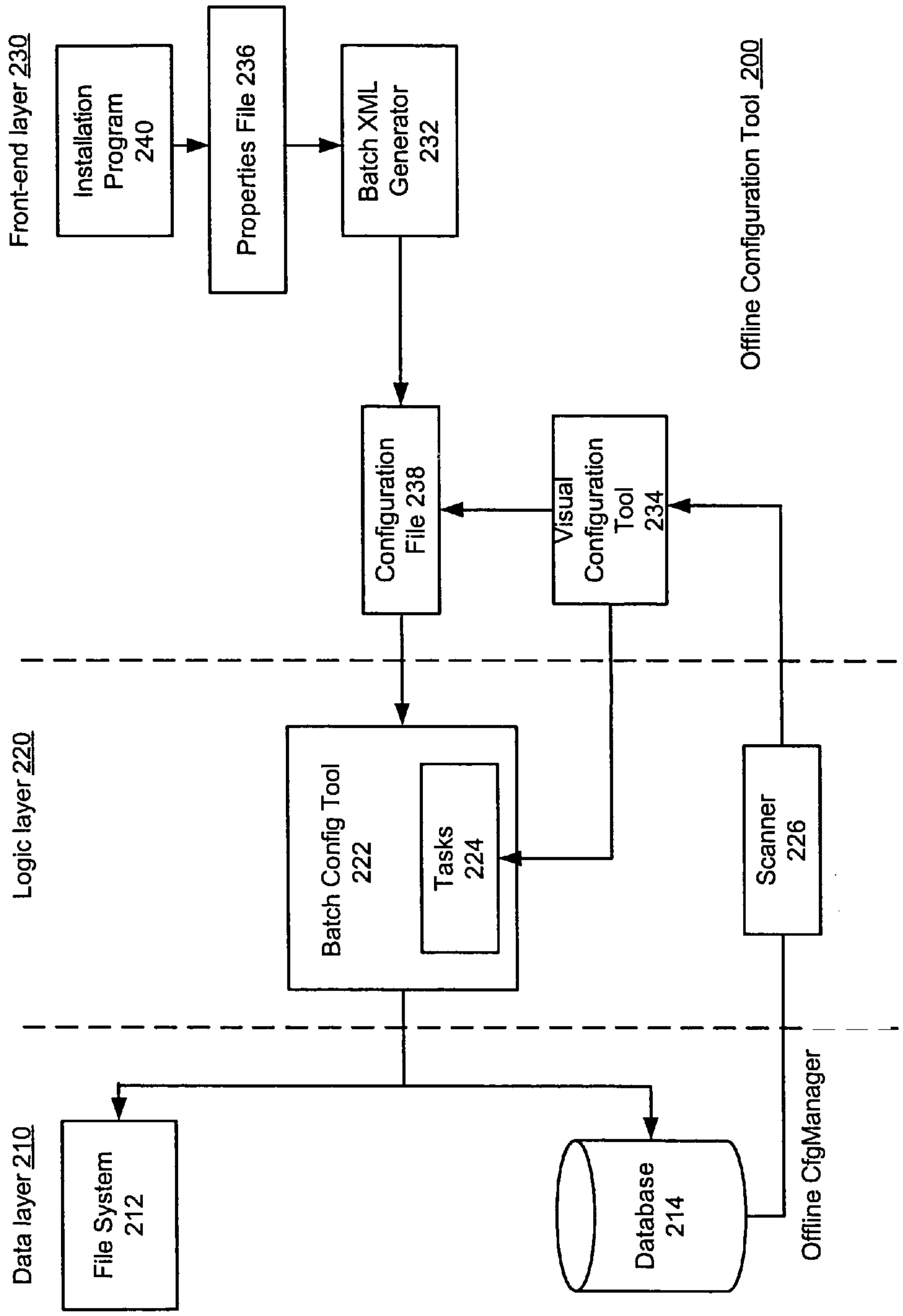
FIG. 2 is a block diagram of an offline configuration tool implemented according to an embodiment of the invention.

FIG. 2 is a block diagram of an offline configuration tool 200 implemented according to an embodiment of the invention. In one embodiment, offline configuration tool 200 may add, remove, and/or configure an application server or a group of communicatively coupled of application servers. Offline configuration tool 200 may be logically divided into data layer 210, logic layer 220, and front-end layer 230.

In the illustrated embodiment, data-layer 210 includes file system 212 and database 214. File system 212 stores data and programs for one or more communicatively coupled application servers. In one embodiment, file system 212 stores the system files for one or more communicatively coupled application servers. The term "system file" broadly refers to files that are part of an operating system and/or other control programs.

Database 214 is a persistent store for data and programs. In an embodiment, database 214 includes a Database Management System (DBMS) to control the persistently stored data including the overall organization of the data, retrieval of the data, and integrity of the data. As is further described below, database 214 may store configuration information for one or more communicatively coupled application servers.

Embodiments of the invention may be described with reference to a "cluster" of application servers. An application server cluster (or simply, cluster) broadly refers to a group of communicatively coupled application servers. The cluster may include one or more application server "instances," a central database (e.g., database 214) and central services. In an embodiment, an application server "instance" includes a group of redundant application servers and a dispatcher (cluster elements). The dispatcher distributes server requests to each of the redundant application servers based on the load of each of the servers. The instances may communicate with each other via a messaging service of the central services. Generally, the cluster elements share a central database. In an embodiment, the cluster may be centrally defined and configured in the central database. An example cluster architecture is further discussed below, with reference to FIG. 12.

Front-end layer 230 provides an interface between offline communication tool 200 and, for example, an end-user and/or another system (e.g., an installation application). In the illustrated embodiment, front-end layer 230 includes batch markup language generator 232 and visual configuration tool 234. In addition, front-end layer 230 may also include a console to provide a text-based interface. As is further described below, batch markup language generator 232 and visual configuration tool 234 receive input (e.g., from installation application 240 or an end-user) and produce configuration file 238 based on the received input.

Batch markup language generator 232 is coupled with installation application 240 via, for example, a network. In an embodiment, installation application 240 provides properties file 236 to batch markup language generator 232. In one embodiment, installation application 240 is a software program that installs cluster elements (e.g., database 214, a dispatcher, and one or more application servers).

In an embodiment, properties file 236 provides initial configuration information for cluster installation. FIG. 3 is an illustration of selected elements of properties file 236, according to an embodiment of the invention. In the illustrated embodiment, the configuration information within properties file 236 is organized into key-value pairs. Each key specifies a configuration parameter and each value specifies a value for the configuration parameter.

In an embodiment, the specified configuration parameters define an initial configuration of a cluster. For example, key-value pair 305 specifies that, initially, the cluster has two application servers. Key-value pair 310 specifies that the system identifier is "06." In an embodiment, the system identifier identifies the cluster. Key-value pair 315 specifies a box number for the cluster. The box number is an identifier that specifies a physical machine on which one or more cluster elements are installed. In an embodiment, the box number may also identify, for example, a system name (e.g., C11), an instance number, and/or whether the instance is a central instance (e.g., JC00) or a dialog instance (e.g., J00).

Figure 12:
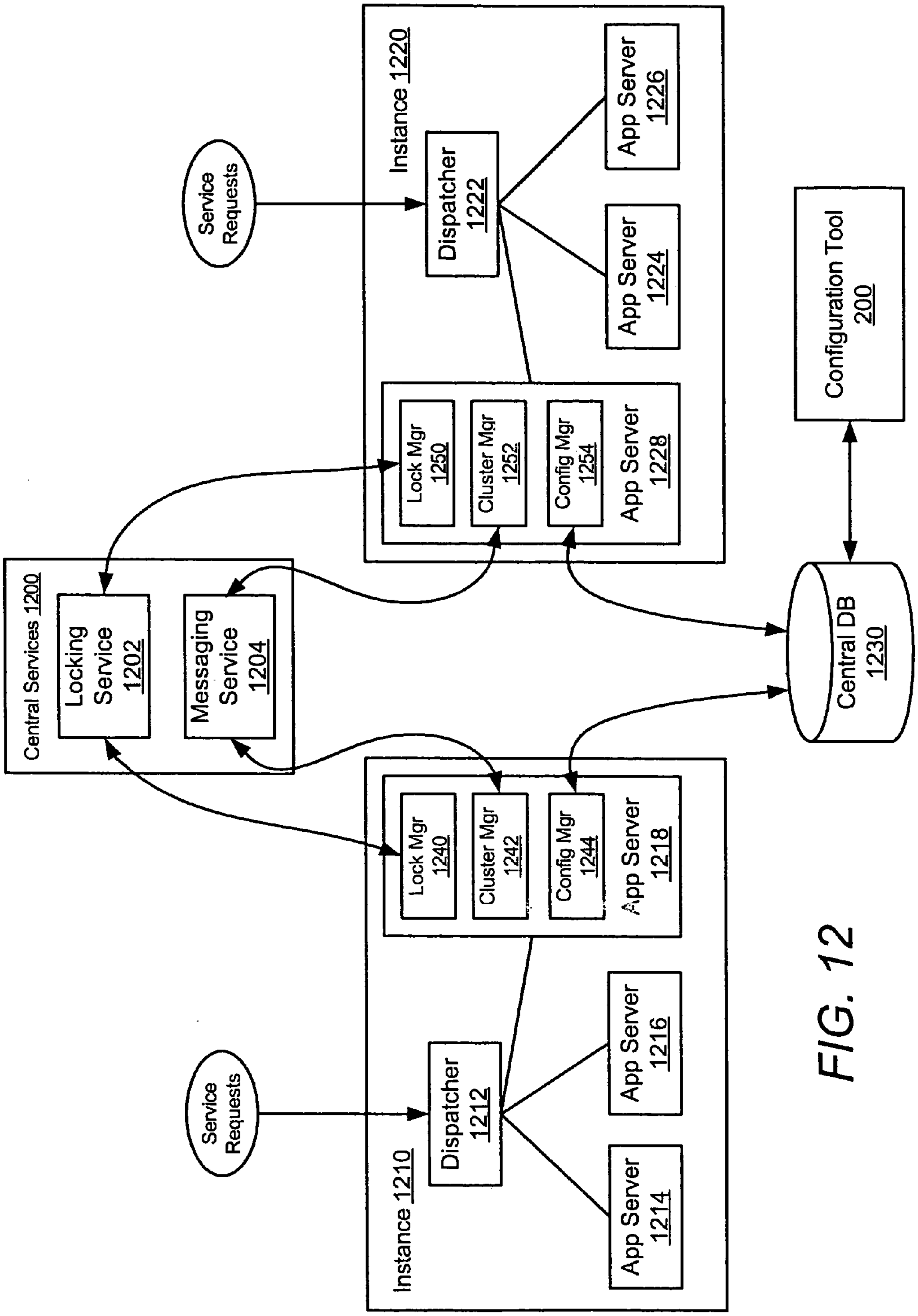
FIG. 12 is an illustration of an application server architecture employed in one embodiment of the invention.

In an embodiment, Properties file 236 also provides configuration parameters for a database (e.g., database 214), a locking service (e.g., locking service 1202, shown in FIG. 12), and/or a message server (e.g., messaging service 1204, shown in FIG. 12). For example, key-value pairs 320 specify database connection information. Similarly, key-value pairs 325 specify a host and port number for the locking service and key-value pairs 330 specify a host and port number for the messaging service. The locking service and messaging service are further discussed below with reference to FIG. 10.

Referring again to FIG. 2, batch markup language generator 232 uses the information in properties file 236 to generate configuration file 238. In an embodiment, configuration file 238 is a markup language file that provides tasks 224 for logic layer 220. In one embodiment, configuration file 238 is an eXtensible Markup Language (XML) file. An XML file refers to a file implemented according to any of the XML standards, for example, the XML standard promulgated by the World Wide Web Consortium (W3C) entitled, "Extensible Markup Language (XML) 1.0 (Second Edition)," 6 Oct. 2000 (hereinafter, the XML Standard).

Figure 4:
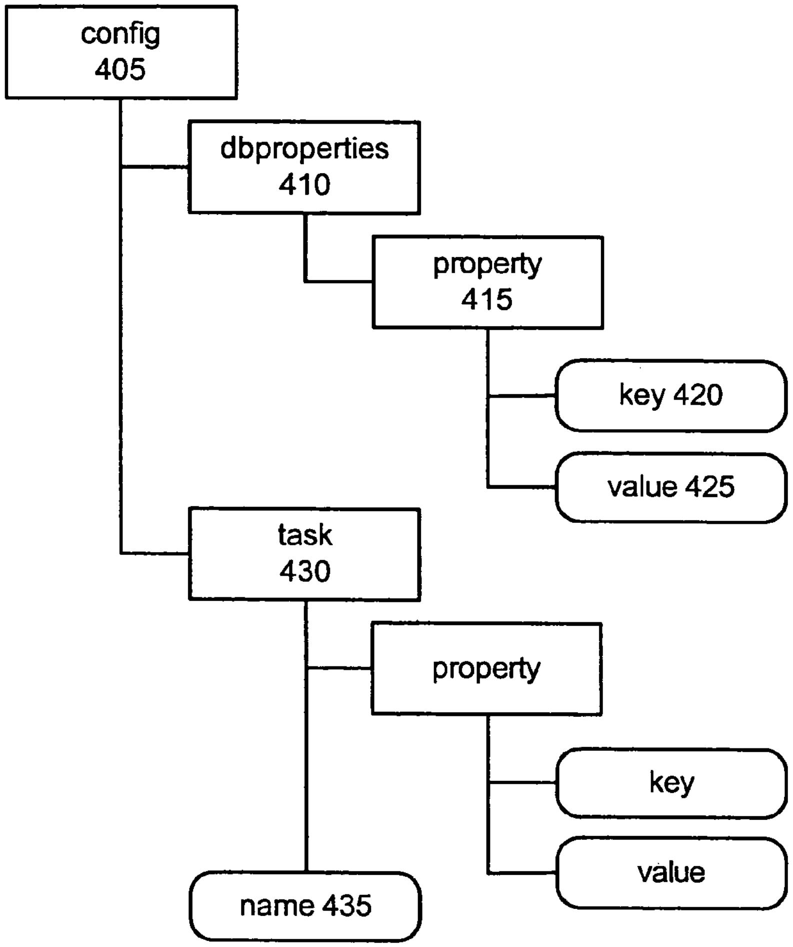
FIG. 4 is an illustration of a document type definition for a configuration file according to an embodiment of the invention.

In an embodiment, the structure of configuration file 238 is based on a predetermined format such as a Document Type Definition (DTD). FIG. 4 is an illustration of a DTD for configuration file 238 according to an embodiment of the invention. In the illustrated embodiment, config element 405 is the root element of configuration file 238. In an embodiment, config element 405 contains information for connecting to a database (e.g., database 214, shown in FIG. 2) and also one or more tasks to configure an application server (or an entire cluster of application servers) that is (or are) defined on the database.

In the illustrated embodiment, dbproperties element 410 contains the properties for connecting to the database. The properties may be organized as key-value pairs. Property element 415 specifies a property for connecting to the database in key 420 and corresponding value 425. Key element 420 identifies a property and value element 425 specifies a value for the identified property. The following code snippet is an example of dbproperties element 410.

```
-<config>
 -<dbproperties>
   <property key="rdbms.maximum_connections" value="5" />
   <property key="system.name" value="C11" />
   <property key="secstorefs.keyfile"
      value="D:\usr\sap\C11\SYS\global\security\data\SecStore.key"
      />
   <property key="secstorefs.secfile"
      value="D:\usr\sap\C11\SYS\global\security\data\SecStore.prope
      rties" />
   <property key="secstorefs.lib"
      value="D:\usr\sap\C11\SYS\global\security\lib" />
   <property key="rdbms.driverLocation"
      value="/sapdb/programs/runtime/jar/sapdbc.jar" />
   <property key="rdbms.connection" value="jdbc/pool/C11" />
   <property key="rdbms.initial_connections" value="1" />
```

In an embodiment, task element 430 contains one or more properties for configuring a cluster of application servers or a portion of a cluster of application servers. The task defined by task element 430 may be executed against database 214 (e.g., a database task) or file system 212 (e.g., a file task). For example, database tasks may include a task to create a new cluster element (e.g., a new application server) or a task to change the properties of a cluster element. File system tasks may include, for example, a task to configure administration properties. In one embodiment, name attribute 435 specifies a name for the task (e.g., create.new.element, as shown below).

The following is a code snippet that illustrates an example of task element 430 that implements a create new element task.

```
-<task name="create.new.element">
   <property key="box.number" value="C11JC06p78124" />
```

-continued

```
    <property key="secstorefs.lib"
        value="D:\usr\sap\C11\SYS\global\security\lib" />
    <property key="rdbms.driverLocation"
        value="/sapdb/programs/runtime/jar/sapdbc.jar" />
    <property key="os.unicode" value="yes" />
    <property key="rdbms.connection" value="jdbc/pool/C11" />
    <property key="rdbms.initial__connections" value="1" />
    <property key="os.name" value="ntintel" />
    <property key="secstorefs.keyfile"
        value="D:\usr\sap\C11\SYS\global\security\data\ SecStore.key"
        />
    <property key="type" value:="dispatcher" />
    <property key="secstorefs.secfile"
        value="D:\usr\sap\C11\SYS\global\security\data\ SecStore.prope
        rties" />
    <property key="rdbms.maximum__connections" value="5" />
    <property key="os.bit.length" value="32" />
    <property key="system.name" value="C11" />
    <property key="r3.environment" value="no" />
    <property key="system.id" value="6" />
</task>
```

The code snippet illustrates that task element 430 may be based, at least in part, on the information provided in properties file 236. For example, the first property provided by the task is box number 315 and the last property provided by the task is system identifier 310. As is further described below, with reference to FIGS. 5-7, tasks generated by visual configuration tool 234 may include information provided by an end-user (e.g., an administrator and/or a developer) rather than information from properties file 236.

Referring again to FIG. 2, batch configuration tool 222 receives tasks 224 from configuration file 238 and/or visual configuration tool 234. In an embodiment, batch configuration tool 222 executes received tasks 224 against database 214 and/or file system 212. In one embodiment, batch configuration tool 222 may store one or more tasks 224 until receiving an indication from, for example, visual configuration tool 234 to execute a "batch" of tasks 224.

In an embodiment, visual configuration tool 234 provides a graphical user interface (GUI) for offline configuration tool 200. As is further discussed below with reference to FIGS. 5-7, visual configuration tool 234 may provide an interface to configure a cluster element, add a cluster element, and/or remove a cluster element. In one embodiment, the GUI provided by visual configuration tool 234 is a swing-based GUI. A Swing-based GUI refers to a GUI that is based on the Swing API provided by, for example, the Java 2 Platform, Standard Edition, Specification, 1.4.2, Nov. 20, 2003.

In an embodiment, visual configuration tool 234 may be used to configure an application server (and/or one or more elements of a cluster of application servers) after it is installed. In one embodiment, visual configuration tool 234 issues database tasks. In such an embodiment, visual configuration tool 234 may be referred to as an "off-line" tool because the application server (or the cluster) need not be running to be configured.

In an embodiment, visual configuration tool 234 uses scanner 226 to scan application server (or cluster) configuration information that is stored on database 214. Visual configuration tool 234 may receive, parse, and display the configuration information. In an embodiment in which database 214 contains configuration information for a cluster, the cluster elements may be displayed as a hierarchical tree structure.

In an embodiment, visual configuration tool 234 provides a GUI so that an end-user can provide input indicating a desire to, e.g., configure an application server (or cluster element), add a cluster element, and/or remove a cluster element. Visual configuration tool 234 receives the provided input and generates configuration file 238. For example, if a user provided input indicating a desire to configure a service so that it is manually started, visual configuration tool 234 might generate the following task.

```
<task name="change.service.properties">
        <property key="service.name" value="classload" />
        <property key="element.name" value="ID7955551" />
        <property key="startup.mode" value="manual" />
    </task>
```

Similarly, if a user provided input indicating a desire to change, for example, the max heap size of a bootstrap process for a cluster element, visual configuration tool 234 might generate the following task.

```
<task name="change.element.info">
        <property key="element.name" value="ID7955500" />
        <property key="bootstrap.java.main.class.parameters"
            value="com.sap.engine.bootstrap.Bootstrap ./bootstrap
            ID007955500" />
        <property key="bootstrap.java.params" value="" />
        <property key="bootstrap.java.classpath"
            value="./bootstrap/launcher.jar" />
        <property key="bootstrap.java.max.heap.size" value="72" />
        <property key="bootstrap.java.path"
        value="D:/jdk/ j2sdk1.4.2__01"
            />
    </task>
```

Figure 5:
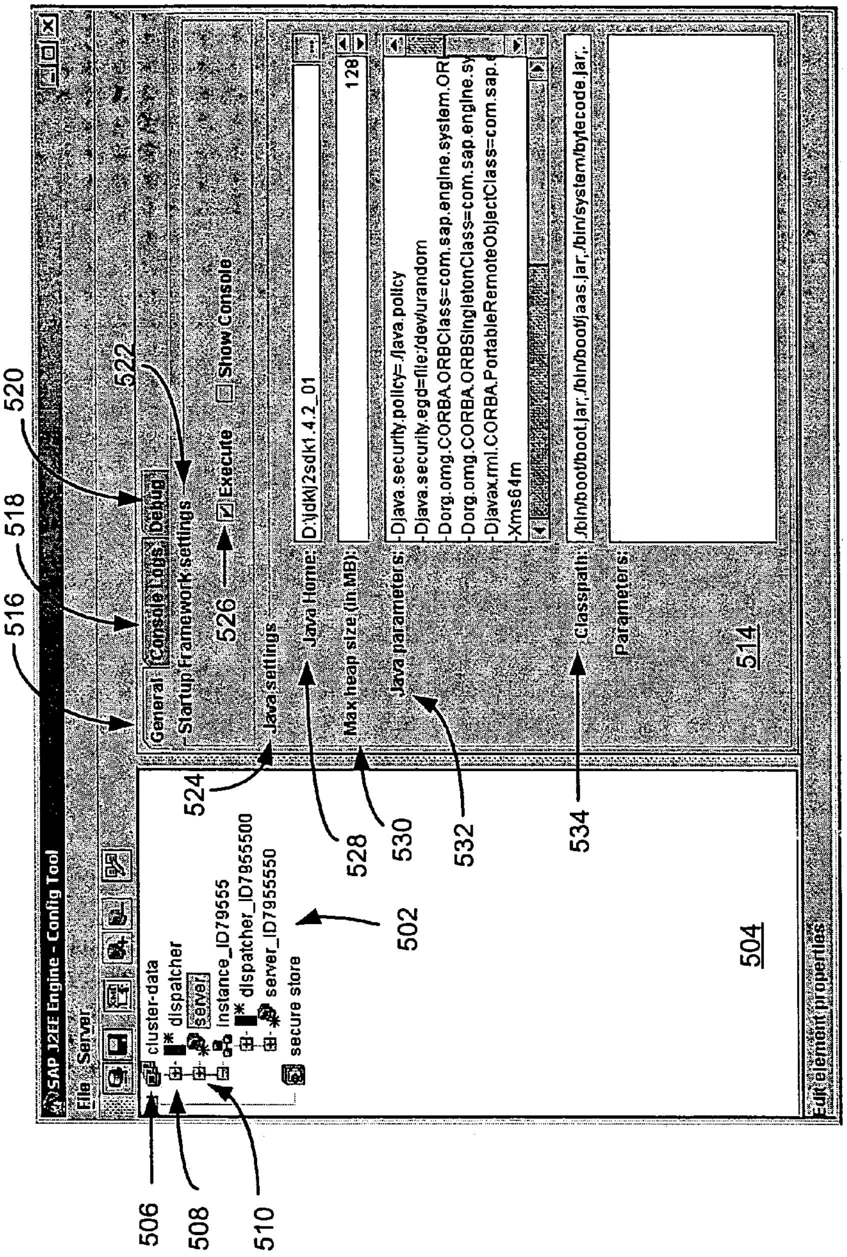
FIG. 5 illustrates an exemplary Graphical User Interface (GUI) provided by a visual configuration tool, according to an embodiment of the invention.

FIG. 5 illustrates an exemplary Graphical User Interface (GUI) 500 provided by visual configuration tool 234, according to an embodiment of the invention. Tree structure 502 is displayed in pane 504 of GUI 500. In an embodiment, tree structure 502 represents the current configuration of a cluster. Root element 506 represents the cluster. Dispatcher element 508 and server element 510 depend from root element 506. In an embodiment, dispatcher element 508 and server element 510 contain the "global" settings for each module. The term "global settings" refers to settings that are valid for all instances of an application server and/or a dispatcher within a cluster.

In the illustrated embodiment, tabs 516, 518, and 520 are displayed responsive to selecting a cluster element (e.g., selected server element 510) in tree structure 502. In one embodiment, general tab 516 provides startup framework settings 522 and Java settings 524. Execute setting 526 specifies whether sever element 510 is executable. In an embodiment in which the cluster element is implemented, at least in part, in the Java platform, home setting 528 specifies the absolute path to the Java home directory. Max heap size setting 530 specifies the maximum size of heap memory used by the Java Virtual Machine (JVM). Java parameters setting 532 specifies one or more parameters that are passed to the JVM. In an embodiment, classpath setting 534 specifies the classpath to external files. An end-user may provide a value (or an indication of a value) for one or more of these settings. In response to receiving the value (or indication of a value), visual configuration tool 234 generates one or more tasks (e.g., tasks 224, as shown in FIG. 2). Visual configuration tool 234 sends the generated tasks to batch configuration tool 222 for execution in, for example, database 214.

Figure 6:
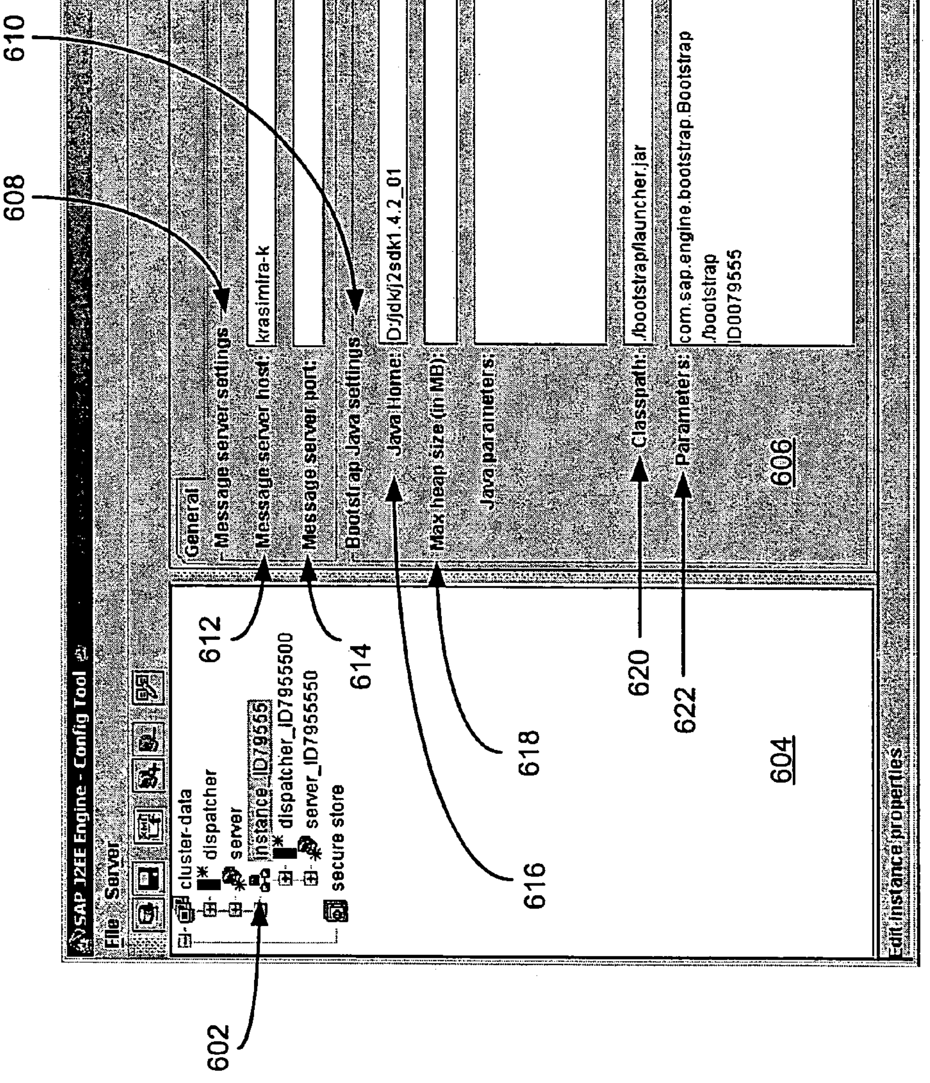
FIG. 6 illustrates an exemplary GUI provided by a visual configuration tool to configure one or more instance properties, according to an embodiment of the invention.

FIG. 6 illustrates an exemplary GUI 600 provided by visual configuration tool 234 to configure one or more instance properties, according to an embodiment of the invention. In the illustrated embodiment, instance element 602 is selected in pane 604. In one embodiment, pane 606 is displayed responsive to selecting instance element 602. Pane 606 is divided into message server settings 608 and bootstrap settings 610. In one embodiment, message settings 608 include host setting 612 and port setting 614.

In an embodiment, bootstrap settings 610 define the bootstrap properties used for downloading instance 602 from database 214. In the illustrated embodiment, bootstrap settings 610 includes, among other settings, Java home setting 616, max heap size setting 618, classpath setting 620, and parameters setting 622. An end-user may provide a value (or an indication of a value) for one or more of these settings. In response to receiving the value (or indication of a value), visual configuration tool 234 generates one or more tasks (e.g., tasks 224, as shown in FIG. 2). Visual configuration tool 234 sends the generated tasks to batch configuration tool 222 for execution in, for example, database 214.

Figure 7:
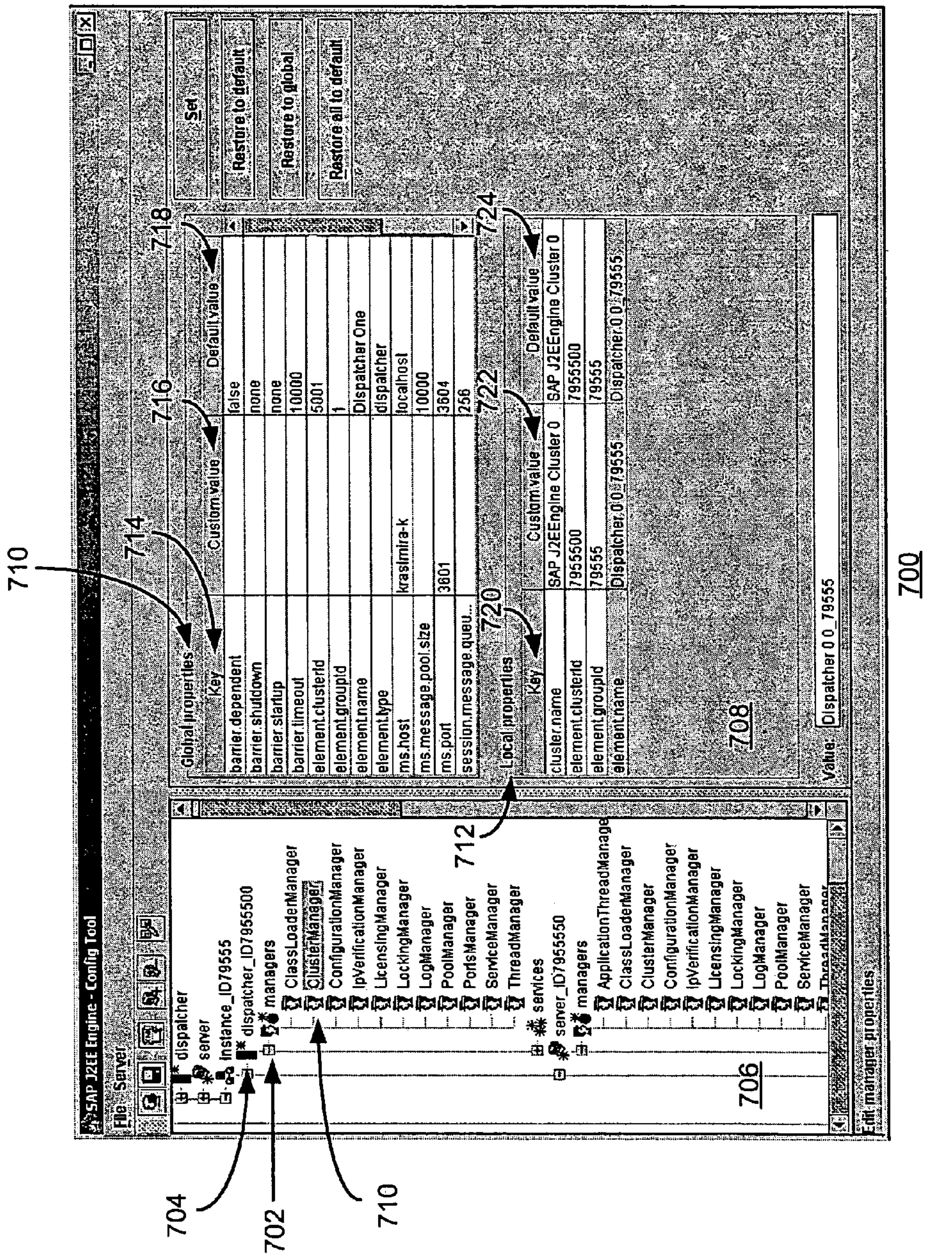
FIG. 7 illustrates an exemplary GUI to configure one or more properties of a manager, according to an embodiment of the invention.

FIG. 7 illustrates an exemplary GUI 700 to configure one or more properties of a manager, according to an embodiment of the invention. Application servers and other cluster elements typically include a number of managers and services. The term "manager" refers to a software entity that manages a function (e.g., a locking manager or a configuration manager). The term "service" refers to a software entity that provides a function (e.g., a messaging service). While GUI 700 illustrates configuring one or more properties of a manager, it is to be understood that, in an embodiment, one or properties of a service may also be configured.

A list of managers 702 for dispatcher 704 are displayed in pane 706. In an embodiment pane 708 is displayed responsive to selecting, for example, manager 710. Pane 708 is divided into global properties section 710 and local properties section 712. Global properties section 710 contains configuration settings for manager 710 (or, if selected, a service) that are valid on all cluster elements. Key column 714 lists the global properties. In an embodiment, custom value column 716 and/or default value column 718 specify current values for the listed properties.

In one embodiment, if an end-user attempts to set a new value for a property in either custom value column 716 or default value column 718, then the property is added to local properties section 712. Local properties section 712 contains configuration properties that are valid on a particular cluster element (e.g., dispatcher 704). Key column 720 lists the local properties while custom value column 722 and/or default value column 724 provide current values for the listed properties. In response to receiving the value (or indication of a value), visual configuration tool 234 generates one or more tasks (e.g., tasks 224, as shown in FIG. 2). Visual configuration tool 234 sends the generated tasks to batch configuration tool 222 for execution in, for example, database 214.

Figure 8:
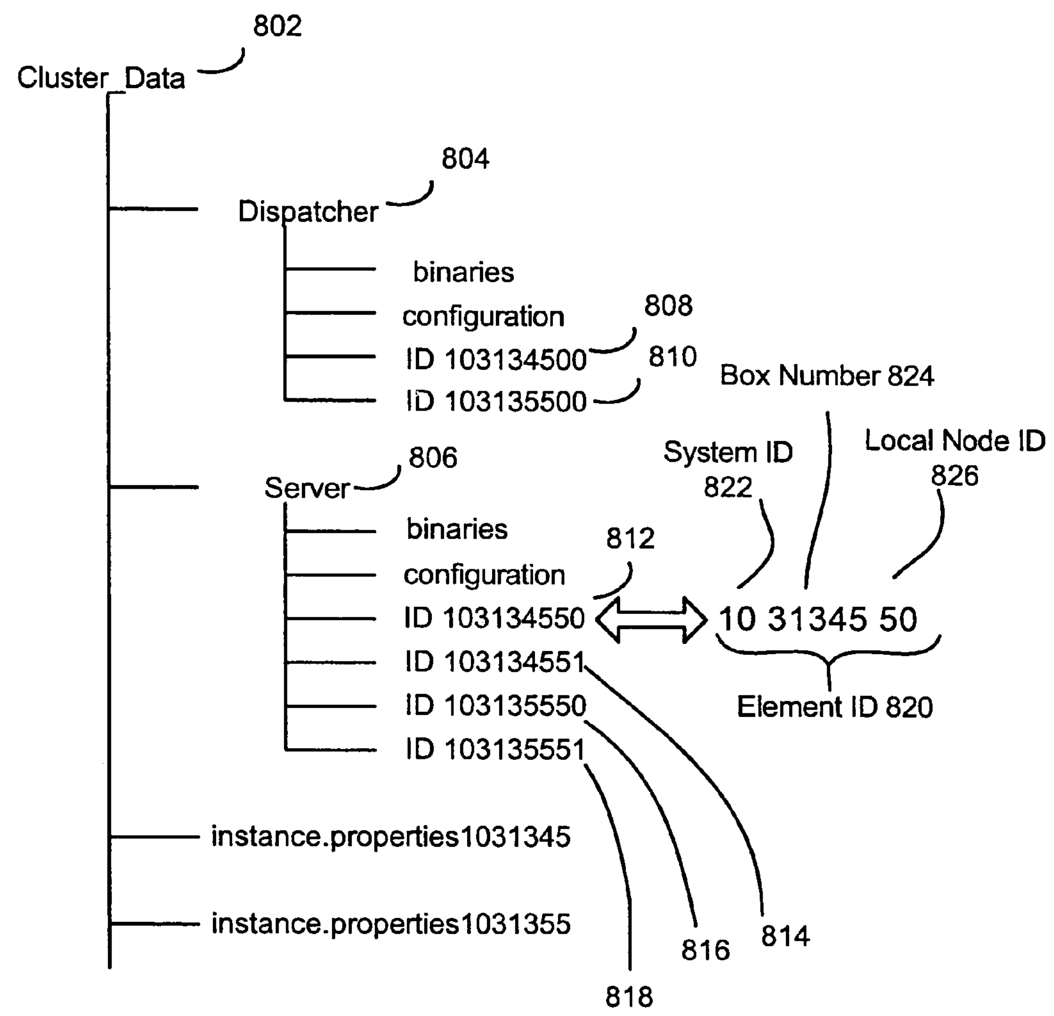
FIG. 8 is an illustration of selected elements of the structure of the cluster in the database after initial configuration
Figure 9:
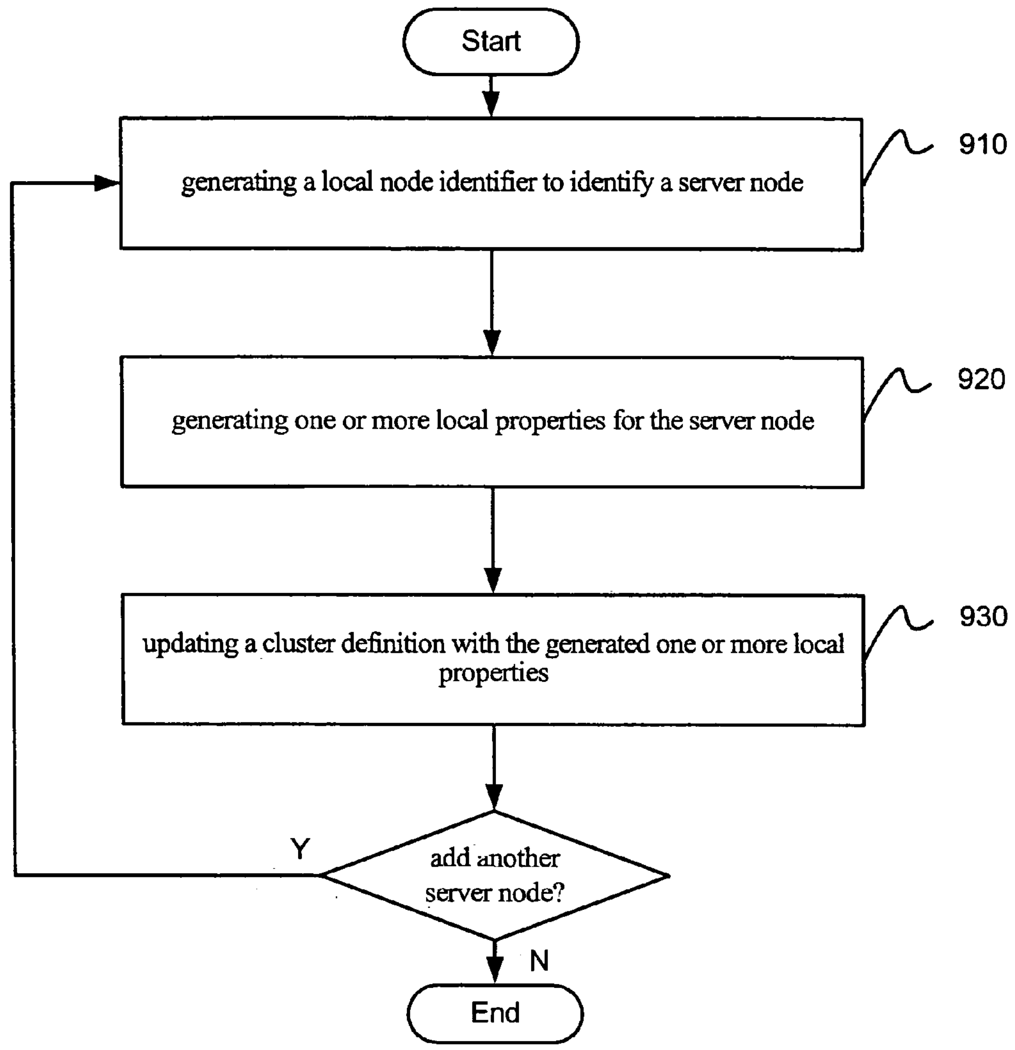
FIG. 9 is a flow diagram illustrating certain aspects of a method for configuring a server node, according to an embodiment of the invention.
Figure 10:
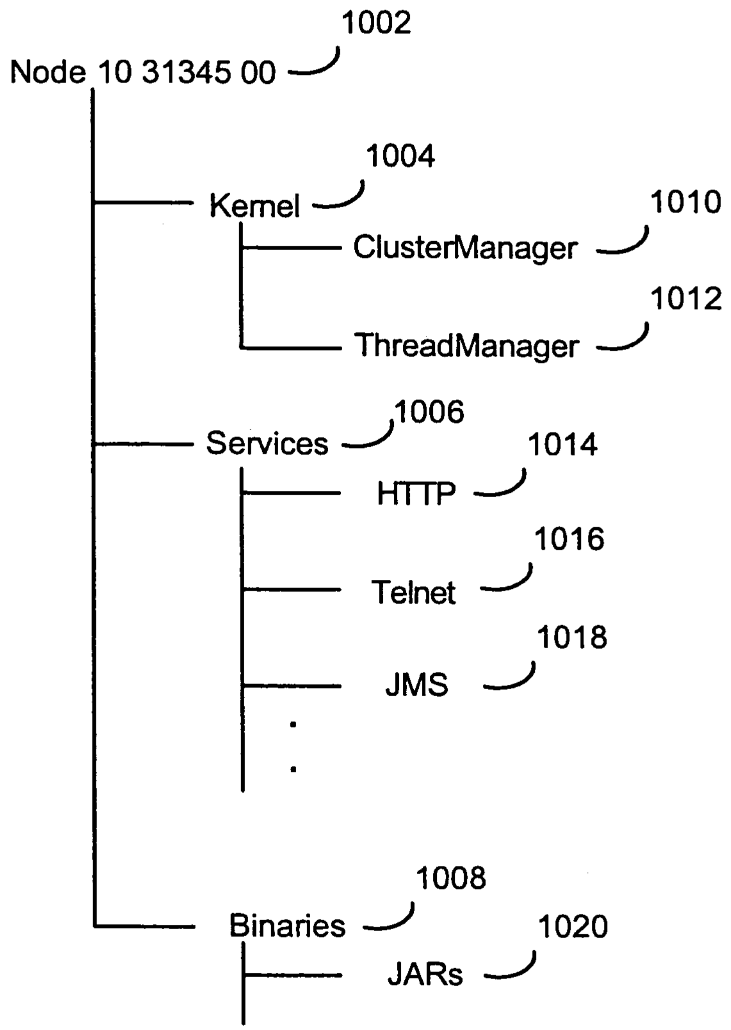
FIG. 10 illustrates selected elements of a server node as defined in a database.

Turning now to FIG. 8-10, the particular methods associated with embodiments of the invention are described in terms of computer software and hardware with reference to a flowchart. The methods to be performed by a configuration tool may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

As described above, offline configuration tool 200 may establish an initial configuration of a cluster (e.g., based on properties file 236) in a database (e.g., database 214, shown in FIG. 2). FIG. 8 is an illustration of selected elements of the structure of the cluster in the database after initial configuration. In the illustrated embodiment, cluster data 802 includes dispatcher 804 and server 806. Dispatcher 804 includes dispatcher cluster elements 808 and 810. Similarly, server 806 includes server cluster elements 812, 814, 816, and 818.

In an embodiment, each cluster element has an element identifier 820. Element identifier 820 may be based, at least in part, on one or more cluster properties. In one embodiment, element identifier 820 includes system identifier 822 to specify the cluster to which the element belongs. In one embodiment, system identifier 822 is a two-digit number between 00 and 99. In an alternative embodiment, system identifier 822 may have more digits, fewer digits, and/or a different range.

Element identifier 820 may also include box number 824 to specify a physical machine on which the cluster element is to run. In the illustrated embodiment, box number 824 is a five-digit number. In one embodiment, the five-digit number is based on a string (e.g., box number 315, shown in FIG. 3). In such an embodiment, the string may be transformed into a five-digit number by an algorithm that ensures that unique box numbers are generated for different strings. In an alternative embodiment, box number 824 may have more digits, fewer digits, and/or may be a string.

In an embodiment, element identifier 820 includes local node identifier 826. Local node identifier 826 specifies whether the cluster element is a dispatcher or an application server. In one embodiment, local node identifier 826 is always 00 if the cluster element is a dispatcher. For a server, local node identifier 826 may be 50 plus a variable. For example, if it is possible to have 16 application severs in an instance, then the variable may have a value between 0 and 15. In an alternative embodiment, local node identifier 826 may have more digits, fewer digits, and/or may be calculated in a different manner. In an embodiment, cluster elements (also referred to as server nodes) may be added (or removed) after the initial configuration is established in the database (e.g., database 214, shown in FIG. 2).

FIG. 9 is a flow diagram illustrating certain aspects of a method for creating a server node, according to an embodiment of the invention. In an embodiment, offline configuration tool 200 may receive an indication of an instruction to create a new server node. For example an end-user may select a "create new cluster element" option in a visual configuration tool (e.g., visual configuration tool 234). Referring to process block 910, offline configuration tool 200 may generate a local node identifier to identify the server node. In one embodiment, the local node identifier is a two-digit number specifying whether the server node is a dispatcher or an application server. If the server node is an application server, offline configuration tool 200 may determine a "first free identifier" for the server node. For example, if the local node identifiers 50 and 51 are already assigned, offline configuration tool 200 may select 52 for the local node identifier.

Referring to process block 920, offline configuration tool 200 generates one or more local properties for the server node. In one embodiment, generating one or more local properties includes generating one or more properties for a manager of the server node (e.g., the ClusterManager of a J2EE engine). In one embodiment, the generated properties include a system identifier (e.g., system identifier 822, as shown in FIG. 8), a box number, (e.g., box number 824, shown in FIG. 8), and an element identifier. In an embodiment, generating one or more local properties may also include generating an element identifier (e.g., element identifier 820, shown in FIG. 8). In such an embodiment, the element identifier may be based, at least in part, on the system identifier, the box number, and/or the local node identifier.

In an embodiment, generating local properties also includes generating properties for one or more services (e.g., HTTP, Telnet, Java Messaging Service (JMS), etc.) of the server node. In one embodiment, a dispatcher having multiple logical dispatcher instances may be running on a physical machine. Each of the logical dispatcher instances may have a number of communication services (e.g., HTTP, Telnet, JMS, etc.) and each of those communication services may require a port. For a given physical machine, the ports should be unique for each instance of the service. In one embodiment, offline configuration tool 200 generates a number of local properties to assign ports for the services used by a dispatcher. Table 1 provides an exemplary set of such properties according to but one embodiment of the invention. In one embodiment, offline configuration tool 200 determines a "portPrefix" value based on the following calculation: portPrefix=50000+system ID*100.

TABLE 1

| Service Name | Property keys | Value |
|---|---|---|
| http | Ports | (Port:<portPrefix>+0,Type:http)<br>(Port:<portPrefix>+1,Type:ssl) |
| iiop | port | <portPrefix> + 7 |
| | initialContextPort | <portPrefix> + 2 |
| | ssl_socket | <portPrefix> + 3 |
| p4 | port | <portPrefix> + 4 |
| | ssl | <portPrefix> + 6 |
| | httptunneling | <portPrefix> + 5 |
| telnet | port | <portPrefix> + 8 |
| jms_provider | /tcp | <portPrefix> + 10 |

Referring to process block 930, offline configuration tool 200 may update the cluster definition with the one or more local properties. In an embodiment, "updating the cluster definition" includes committing the generated local properties to the database (e.g., database 214, shown in FIG. 2). FIG. 10 illustrates selected elements of server node 1002 as defined in a database. Server node 1002 includes kernel 1004, services 1006, and binaries 1008.

In an embodiment, kernel 1004 includes the fundamental elements of program code for server node 1002. For example, kernel 1004 may include managers such as ClusterManager 1010 and ThreadManager 1012. In an embodiment, each manager may include a number of configuration properties that, in part, define the managers.

Services 1006 may include the services available to node 1002. In the illustrated embodiment, services 1006 includes HTTP service 1014, Telnet service 1016, and JMS service 1018. In an embodiment each service may include a number of configuration properties that, in part, define the services.

In one embodiment, binaries 1008 includes basic information used during the bootstrap process. For example, binaries 1008 may include parameters that configure the Java Virtual Machine. In one embodiment, Java Archives (JARs) 1020 include global properties, that is, properties that apply to all server nodes in the cluster.

In one embodiment, a bootstrap process is used to synchronize, for example, a file system (e.g., file system 212) with the updated cluster definition. In one embodiment, the system files for a cluster are part of a J2EE engine (e.g., an implementation of a the J2EE Standard). The bootstrap process may include synchronizing the server node (as implemented in the file system) with the binaries (e.g., binaries 1008, as shown in FIG. 10); synchronizing one or more global properties; and synchronizing the one or more local properties. In an alternative embodiment, the bootstrap may include more processes, fewer processes, and/or different processes.

Figure 11:
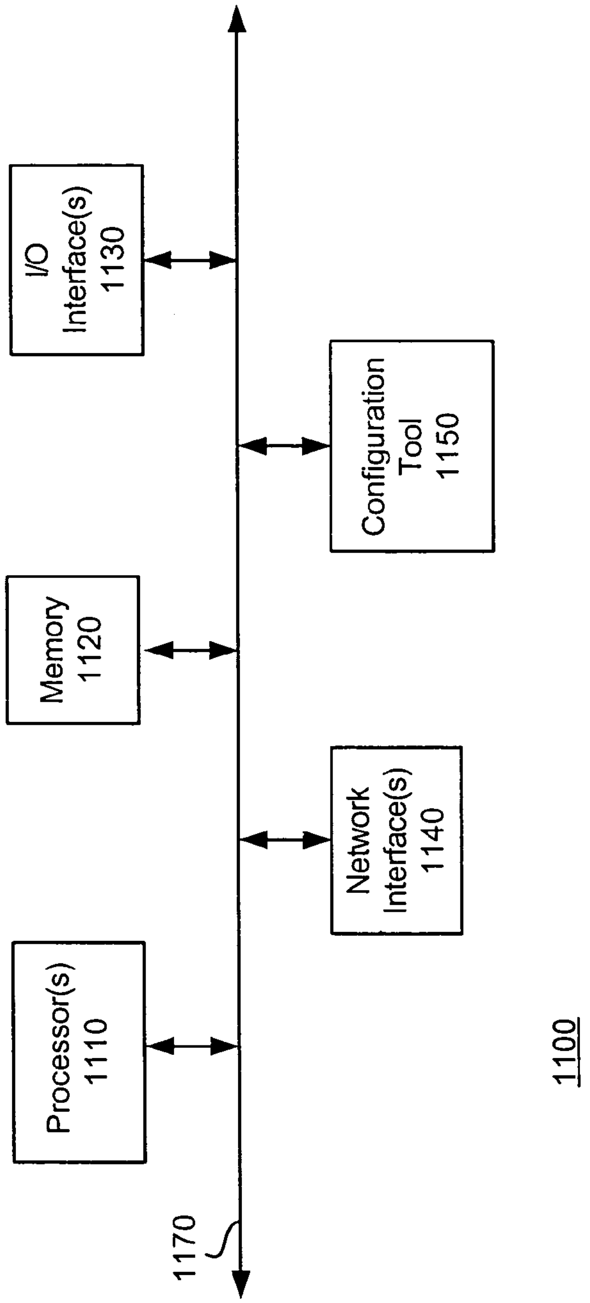
FIG. 11 is a block diagram of a computing device implemented according to an embodiment of the invention.

FIG. 11 is a block diagram of computing device 1100 implemented according to an embodiment of the invention. Computing device 1100 may include: processor(s) 1110, memory 1120, one or more Input/Output interfaces 1130, network interface(s) 1140, and configuration tool 1150. The illustrated elements may be connected together through system interconnection 1170. Processor(s) 1110 may include a microprocessor, microcontroller, field programmable gate array (FPGA), application specific integrated circuit (ASIC), central processing unit (CPU), programmable logic device (PLD), and similar devices that access instructions from system storage (e.g., memory 1120), decode them, and execute those instructions by performing arithmetic and logical operations.

Configuration tool 1150 enables computing device 1100 to configuration an application server (or a cluster of application servers). Configuration tool 1150 may be executable content, control logic (e.g., ASIC, PLD, FPGA, etc.), firmware, or some combination thereof, in an embodiment of the invention. In embodiments of the invention in which configuration tool 1150 is executable content, it may be stored in memory 1120 and executed by processor(s) 1110.

Memory 1120 may encompass a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory 1120 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory 1120 may store program modules such as routines, programs, objects, images, data structures, program data, and other program modules that perform particular tasks or implement particular abstract data types that facilitate system use.

One or more I/O interfaces 1130 may include a hard disk drive interface, a magnetic disk drive interface, an optical drive interface, a parallel port, serial controller or super I/O controller, serial port, universal serial bus (USB) port, a display device interface (e.g., video adapter), a network interface card (NIC), a sound card, modem, and the like. System interconnection 1170 permits communication between the various elements of computing device 1100. System interconnection 1170 may include a wide variety of signal lines including one or more of a memory bus, peripheral bus, local bus, host bus, bridge, optical, electrical, acoustical, and other propagated signal lines.

In one embodiment of the invention, the configuration tool (e.g., offline configuration tool 200, shown in FIG. 2) is used to configure resources within a cluster of application server nodes. An exemplary application server architecture will now be described.

An application server architecture employed in one embodiment of the invention is illustrated in FIG. 12. The architecture includes central services "instance" 1200 and a plurality of application server "instances" 1210, 1220. As used herein, application server instances, 1210 and 1220, each include a group of server nodes 1214, 1216, 1218 and 1224, 1226, 1228, respectively, and a dispatcher, 1212, 1222, respectively. Central services instance 1200 includes locking service 1202 and messaging service 1204 (described below). The combination of all of the application instances 1210, 1220 and central services instance 1200 is referred to herein as a "cluster." Although the following description will focus solely on instance 1210 for the purpose of explanation, the same principles apply to other instances such as instance 1220.

Server nodes 1214, 1216, 1218 within instance 1210 provide the business and/or presentation logic for the network applications supported by the system. Each of the server nodes 1214, 1216, 1218 within a particular instance 1210 may be configured with a redundant set of application logic and associated data. In one embodiment, dispatcher 1212 distributes service requests from clients to one or more of server nodes 1214, 1216, 1218 based on the load on each of the servers. For example, in one embodiment, a dispatcher implements a round-robin policy of distributing service requests (although various alternate load balancing techniques may be employed).

In one embodiment of the invention, server nodes 1214, 1216, 1218 are Java 2 Platform, Enterprise Edition ("J2EE") server nodes which support Enterprise Java Bean ("EJB") components and EJB containers (at the business layer) and Servlets and Java Server Pages ("JSP") (at the presentation layer). Of course, certain aspects of the invention described herein may be implemented in the context of other software platforms including, by way of example, Microsoft .NET platforms and/or the Advanced Business Application Programming ("ABAP") platforms developed by SAP AG, the assignee of the present application.

In one embodiment, communication and synchronization between each of instances 1210 and 1220 is enabled via central services instance 1200. As illustrated in FIG. 12, central services instance 1200 includes messaging service 1204 and locking service 1202. Message service 1204 allows each of the servers within each of the instances to communicate with one another via a message passing protocol. For example, messages from one server may be broadcast to all other servers within the cluster via messaging service 1204. In addition, messages may be addressed directly to specific servers within the cluster (e.g., rather than being broadcast to all servers).

In one embodiment, locking service 1202 disables access to (i.e., locks) certain specified portions of configuration data and/or program code stored within a central database 1230. Locking managers 1240 and 1250 employed within the server nodes lock data on behalf of various system components which need to synchronize access to specific types of data and program code (e.g., such as the configuration managers 1244 and 1254). As described in detail below, in one embodiment, locking service 1202 enables a distributed caching architecture for caching copies of server/dispatcher configuration data.

In one embodiment, messaging service 1204 and locking service 1202 are each implemented on dedicated servers. However, messaging service 1204 and the locking service 1202 may be implemented on a single server or across multiple servers while still complying with the underlying principles of the invention.

As illustrated in FIG. 12, each server node (e.g., 1218, 1228) includes a lock manager 1240, 1250 for communicating with locking service 1202; a cluster manager 1242, 1252 for communicating with messaging service 1204; and a configuration manager 1244, 1254 for communicating with central database 1230 (e.g., to store/retrieve configuration data). Although lock managers 1240 and 1250, cluster managers 1242 and 1252, and configuration managers 1244 and 1254 are illustrated with respect to particular server nodes, 1218 and 1228, in FIG. 12, each of the server nodes 1214, 1216, 1224 and 1226 and/or on the dispatchers 1212, 1222 may be equipped with equivalent lock managers, cluster managers and configuration managers.

Elements of embodiments of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, embodiments of the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method employed within a network comprising:

generating a local node identifier to identify a server node to be added to a cluster of server nodes;

specifying the identified server node, via the local node identifier, as a dispatcher or an application server;

automatically generating, using a computer including one or more hardware-based processors coupled to a memory device, one or more local properties for the specified server node, in response to receiving an input instruction to add the server node to the cluster, the properties based on the specified server node; and updating a cluster definition with the generated one or more local properties, wherein the cluster definition is persistently stored in a database.

2. The method of claim 1, wherein generating the local node identifier comprises:

selecting a next available server node identifier from a group of available server node identifiers.

3. The method of claim 1, wherein generating one or more local properties for the server node comprises:

determining a system identifier to identify a cluster to which the server node is to be added;

determining an element identifier, to uniquely identify the server node within the cluster; and determining a port number to identify a communication port for the server node.

4. The method of claim 3, wherein the element identifier is based on the system identifier;

a box number; and the local node identifier.

5. The method of claim 3, wherein determining the port number comprises:

determining a first port number of a range of available port numbers.

6. The method of claim 1, wherein generating the local node identifier comprises:

assigning a static identifier to identify the dispatcher.

7. The method of claim 1 wherein generating one or more local properties for the server node which is a dispatcher comprises:

generating a system identifier property;

generating an element identifier to uniquely identify the dispatcher within the cluster, and generating one or more port numbers to provide one or more ports for the dispatcher.

8. The method of claim 7, wherein generating one or more port numbers comprises generating at least one of:

a HypterText Transport Protocol Port number, a Telnet port number; and a Java Messaging Service port number.

9. The method of claim 1, wherein updating the cluster definition with the one or more local properties further comprises at least one of:

synchronizing one or more binaries for the server node;

synchronizing one or more global properties for the server node; and synchronizing one or more local properties of the server node.

10. An apparatus comprising:

a network interface to connect to a database; and a computer including a processor and a memory couped to the processor, the memory including logic executable on the processor to perform a method including:

generating a local node identifier to identify a server node to be added to a cluster of server nodes;

specifying the identified server node via the local node identifier as a dispatcher or an application server;

automatically generating one or more local properties for the server node, in response to receiving an input instruction to add the server node to the cluster, the properties based on the specified server node; and updating a cluster definition with the generated one or more local properties, wherein the cluster definition is persistently stored in the database.

11. The apparatus of claim 10, wherein the processor and logic executable thereon to perform the method of generating one or more local properties for the server node by further performing a method including:

determining a system identifier to identify a cluster to which the server node is to be added;

determining an element identifier, to uniquely identify the server node within the cluster; and determining a port number to identify a communication port for the server node.

12. The apparatus of claim 11, wherein the element identifier is based on the system identifier;

a box number; and the local node identifier.

13. The apparatus of claim 10, wherein the processor and logic executable thereon to perform the method of generating one or more local properties for the dispatcher by further performing the method including:

generating a system identifier property;

generating an element identifier to uniquely identify the dispatcher within the cluster; and generating one or more port numbers to provide one or more ports for the dispatcher node.

14. The apparatus of claim 10, wherein the processor and logic executable thereon to perform the method of updating the cluster definition with the generated one or more local properties by further performing a method including:

synchronizing one or more binaries for the server node;

synchronizing one or more global properties for the server node; and synchronizing one or more local properties of the server node.

15. A system comprising:

means for generating a local node identifier to identify a server node to be added to a cluster of server nodes, means for specifying the identified server node, via the local node identifier, as a dispatcher or an application server;

means for automatically generating one or more local properties for the server node, in response to receiving an input instruction to add the server node to the cluster, the properties based on the specified server node; and means for updating a cluster definition with the generated one or more local properties, wherein the cluster definition is persistently stored in a database.

16. The system of claim 15, wherein the means for generating one or more local properties for the server node comprises:

means for determining a system identifier to identify a cluster to which the server node is to be added;

means for determining an element identifier, to uniquely identify the server node within the cluster; and means for determining a port number to identify a communication port for the server node.

17. The system of claim 16, wherein the identifier is based on the system identifier;

a box number; and the local node identifier.

18. The system of claim 15, wherein the means for updating the cluster definition with the generated one or more local properties comprises at least one of:

means for synchronizing one or more binaries for the server node;

means for synchronizing one or more global properties for the server node; and means for synchronizing one or more local properties of the server node.

19. An article of manufacture comprising:

an electronically accessible non-transitory storage medium providing instructions that, when executed by an apparatus, cause the apparatus to perform the method including:

generating a local node identifier to identify a server node to be added to a cluster of server nodes;

specifying the identified server node, via the local node identifier, as a dispatcher or an application server;

automatically generating one or more local properties for the server node, in response to receiving an input instruction to add the server node to the cluster, the properties based on the specified server node; and updating a cluster definition with the generated one or more local properties, wherein the cluster definition is persistently stored in a database.

20. The article of manufacture of claim 19, wherein the instructions that, when executed by the apparatus, cause the apparatus to perform the method of generating one or more local properties for the server node by further performing a method including:

determining a system identifier to identify a cluster to which the server node is to be added;

determining an element identifier, to uniquely identify the server node within the cluster; and determining a port number to identify a communication port for the server node.

21. The article of manufacture of claim 19, wherein the element identifier is based on the system identifier;

a box number; and the local node identifier.

22. The article of manufacture of claim 19, wherein the instructions that, when executed by the apparatus, cause the apparatus to perform the method of generating one or more local properties for the dispatcher by further performing a method including:

generating a system identifier property;

generating an element identifier to uniquely identify the dispatcher within the cluster; and generating one or more port numbers to provide one or more ports for the dispatcher.

23. The article of manufacture of claim 22, wherein the instructions that, when executed by the apparatus, cause the apparatus to perform the method of generating one or more port numbers by further performing a method including generating at least one of:

a HypterText Transport Protocol Port number, a Telnet port number; and a Java Messaging Service port number.

24. The article of manufacture of claim 19, wherein the instructions that, when executed by the apparatus, cause the apparatus to perform the method of updating the cluster definition with the generated one or more local properties by further performing a method including:

synchronizing one or more binaries for the server node;

synchronizing one or more global properties for the server node; and synchronizing one or more local properties of the server node.

* * * * *